(12) United States Patent
Scislowicz et al.

(10) Patent No.: US 9,177,252 B2
(45) Date of Patent: Nov. 3, 2015

(54) INCREMENTAL DFA COMPILATION WITH SINGLE RULE GRANULARITY

(71) Applicant: Intel Corporation, Santa Clara, CA (US)

(72) Inventors: Adam Scislowicz, San Jose, CA (US); Michael Ruehle, Albuquerque, NM (US); Qiyan Sun, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 259 days.

(21) Appl. No.: 13/755,201

(22) Filed: Jan. 31, 2013

(65) Prior Publication Data

US 2014/0214748 A1    Jul. 31, 2014

(51) Int. Cl.
G06N 5/02        (2006.01)

(52) U.S. Cl.
CPC ...................................... *G06N 5/025* (2013.01)

(58) Field of Classification Search
None
See application file for complete search history.

(56) References Cited

U.S. PATENT DOCUMENTS

2004/0162826 A1*    8/2004    Wyschogrod et al. ............ 707/6
2013/0073503 A1*    3/2013    Nagao ............................ 706/45

* cited by examiner

*Primary Examiner* — Kakali Chaki
*Assistant Examiner* — Michael Zidanic
(74) *Attorney, Agent, or Firm* — Barnes & Thornburg LLP

(57) ABSTRACT

A composite DFA for multiple regular expressions or other rules may be generated in a two-step process—first compiling single rule DFAs, then performing subset construction on those DFAs to generate the composite DFA, with subset information retained. A new batch of one or more rules may be added by another subset construction from the old composite DFA and new single rule DFAs, with subset information for the new composite DFA compressed into sets of states from old and new single rule DFAs. A batch of one or more rules is deleted by deleting references to single rule DFA states from composite DFA subsets, deleting composite DFA states with empty subsets and merging composite DFA states with identical subsets. Rules are changed by deleting the old versions and then adding the new versions.

10 Claims, 12 Drawing Sheets

INCREMENTAL DFA COMPILATION WITH SINGLE RULE GRANULARITY

BACKGROUND OF THE INVENTION

With the maturation of computer and networking technology, the volume and types of data transmitted on the various networks have grown considerably. For example, symbols in various formats may be used to represent data. These symbols may be in textual forms, such as ASCII, EBCDIC, 8-bit character sets or Unicode multi-byte characters, for example. Data may also be stored and transmitted in specialized binary formats representing executable code, sound, images, and video, for example. Along with the growth in the volume and types of data used in network communications, a need to process, understand, and transform the data has also increased. For example, the World Wide Web and the Internet comprise thousands of gateways, routers, switches, bridges and hubs that interconnect millions of computers. Information is exchanged using numerous high level protocols. Further, instructions in other languages may be included with these standards, such as Java and Visual Basic. In an attempt to reduce the complexity associated with routing decisions, it is common for protocols to be organized in a matter resulting in protocol specific headers and unrestricted payloads. Subdivision of the packet information into packets and providing each packet with a header is also common at the lowest level. This enables the routing information to be at a fixed location thus making it easy for routing hardware to find and interpret the information. With the increasing nature of the transmission of information, there is an increasing need to be able to identify the contents and nature of the information as it travels across servers and networks. Once information arrives at a server, having gone through all of the routing, processing and filtering along the way, it is typically further processed. This further processing necessarily needs to be high speed in nature.

SUMMARY OF THE INVENTION

An embodiment of the invention may therefore comprise a method of constructing a composite DFA using subset construction, the method comprising compiling at least one single-rule DFA, performing a first subset construction on the at least one single-rule DFA to generate a first composite DFA, retaining subset information for the first composite DFA, compiling at least one new rule into at least one corresponding additional single-rule DFA, and performing a second subset construction to generate a second composite DFA, wherein the first composite DFA acts as a first NFA input for the second subset construction and the at least one additional single-rule DFA acts as at least one additional NFA input for the second subset construction, retaining subset information for the second composite.

An embodiment of the invention may further comprise a method of constructing a composite DFA using subset construction, said method comprising compiling a plurality single-rule DFAs, performing a first subset construction on the plurality single-rule DFAs to generate a first composite DFA, retaining subset for the first composite DFA, searching the subset information for subsets containing single-rule DFA states corresponding to a rule to be deleted, deleting all single-rule DFA state references found during the search from the subset information, and deleting any composite DFA state whose subset becomes empty after the step of deleting all single-rule DFA state references.

An embodiment of the invention may further comprise a system for constructing a composite DFA using subset construction, the system comprising a compiler, and a first set of rules, wherein the compiler compiles a first set of single-rule DFAs from the first set of rules, subset constructs the single-rule DFAs into a first composite DFA, retaining subset information for the first composite DFA, compiles at least one new rule into at least one corresponding additional single-rule DFA, and subset constructs a second composite DFA using the first composite DFA as a first NFA input for subset construction and the at least one additional single-rule DFA as at least one additional NFA input for subset construction, retaining subset information.

DETAILED DESCRIPTION OF THE EMBODIMENTS

Figure 1:
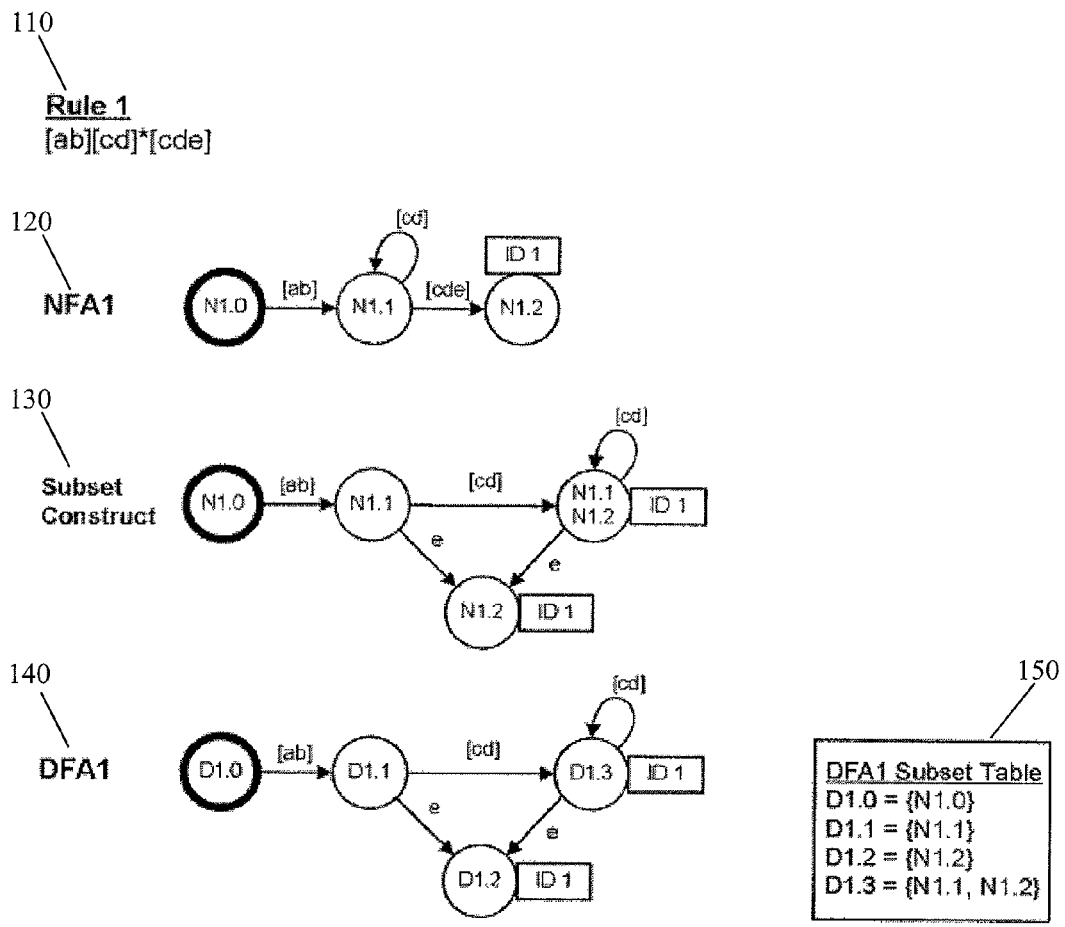
FIG. 1 shows a subset construction of a DFA for a Rule1.

The first processing step that is typically required by protocols, filtering operations, and document type handlers is to organize sequences of symbols into meaningful, application specific classifications. Different applications use different terminology to describe this process. Text oriented applications typically call this type of processing lexical analysis. Other applications that handle non-text or mixed data types call the process pattern matching.

Performing lexical analysis or pattern matching is generally a computationally expensive step. This is because every symbol of information needs to be examined and dispositioned.

Regular expressions are well known in the prior art and are used for pattern matching and lexical analysis. Regular expressions provides a concise and flexible means for "matching" strings of text, such as particular characters, words, or patterns of characters. Abbreviations for "regular expression" include "regex" and regexp" and these abbreviations may be used throughout this specification interchangeably with each other and with the term "regular expression". A regular expression is written in a formal language that can be interpreted by a regular expression processor, which can be a program that examines text or other characters in and identifies parts that match the provided rules of the regular expression. A regular expression in its simplest expression is a pattern. It is an expression that specifies a set of strings.

Examples of specifications that could be expressed in a regular expression are as follows:

the sequence of characters "car" appearing consecutively in any context, such as in "car", "cartoon", or "bicarbonate"

the sequence of characters "car" occurring in that order with other characters between them, such as in "Icelander" or "chandler"

the word "car" when it appears as an isolated word the word "car when preceded by the word "blue" or "red"

the word "car" when not preceded by the word "motor"

a dollar sign immediately followed by one or more digits, and then optionally a period and exactly two more digits (for example, "$100" or "$245.98").

These sequences are simple and are intended only for purposes of example. Specifications of great complexity are conveyable by regular expressions.

Regular expressions are used by many text editors, utilities, and programming languages to search and manipulate text based on patterns. Some of these languages, including Perl, Ruby, AWK, and Tcl and may integrate regular expressions into the syntax of the core language itself. Other programming languages like .NET languages, Java, and Python provide regular expressions through standard libraries.

To find matches to regular expressions or similar pattern matching rules within a symbol stream, two main types of state machines may be constructed, nondeterministic and deterministic finite automata (NFAs and DFAs). Abstractly, an NFA or DFA is a directed graph, in which each graph vertex is a state and each graph edge is labeled with a class of input symbols that it accepts. These edges represent a transition from a source state to a destination state on that symbol class. The main difference between NFAs and DFAs in that any two out-transitions from a DFA state must have non-intersecting symbol classes. However, a single NFA state may have multiple out-transitions labeled with classes containing the same symbol.

A composite DFA for multiple regular expressions or other rules is generated in a two-step process. The steps may comprise first compiling single-rule DFAs, and then performing subset construction on those single-rule DFAs to generate the composite DFA, with subset information retained. A new batch of one or more rules may be added by another subset construction from the old composite DFA and new single-rule DFAs, subset information for the new composite DFA being flattened into sets of states from old and new single-rule DFAs. A batch of one or more rules may be deleted by deleting references to single-rule DFA states from composite DFA subsets, deleting composite DFA states with empty subsets and merging composite DFA states with identical subsets. Rules are changed by deleting the old versions and then adding the new versions.

When a moderately large or complex set of rules is to be matched, a DFA constructed to match those rules is, likewise, often very large. DFA construction issues include "state explosion", in which complexities of various rules interact in many combinations, resulting in a number of DFA states being constructed which is much larger than the number of symbols in the ruleset. DFA size can be an exponential function of ruleset size. Depending on the severity of state explosion, a useful ruleset may compile into thousands, millions, or billions of states. By contrast, an NFA typically has a moderate number of states, that number being proportional to the length of the rule(s) it represents.

Regular expressions, or similar rulesets, are generally compiled into NFAs as a first step in a compilation process. These NFAs, which are relatively straightforward to construct, substantially resemble the rules they represent. Singular DFAs can then be constructed from one or more of these NFAs using subset construction. Subset construction is a computationally expensive exercise in terms of time and memory resources.

Regular expressions, and other ruleset applications, often undergo substantial frequency of changes during a developmental phase or an in-service phase. These changes can be incremental, such as adding, deleting, or changing a small number of rules. There may be thousands of rules in the regular expression, or ruleset. Ruleset and DFA updates and changes often occur at local service points with weak computing resources.

In an embodiment of the invention, a method and system of generating a DFA for multiple rules by generating individual single-rule DFAs is disclosed. These individual DFAs are treated as NFAs and subset construction is performed, retaining subset lists for composite DFA states. A rule may be deleted from a multi-rule DFA by deleting references to corresponding single-rule DFA states from subset lists in the composite DFA and deleting composite states with empty subsets, then merging composite states with identical subsets.

One or more NFAs may be translated into a DFA by the well-known method of subset construction. In this method, each constructed DFA state corresponds to, or represents, a unique subset of all possible NFA states. An initial, or root, DFA state is first constructed representing the subset of all initial NFA states. To construct additional DFA states, each possible symbol X is considered to transition from an existing DFA state D.

A subset of NFA states is constructed as follows: For each NFA state A in the subset corresponding to D, if A has a transition on the symbol X to some destination NFA state B, then B is added to the subset. If some existing DFA state E corresponds to this constructed subset, then a transition is created from D to E on the symbol X. Otherwise, a new DFA state F is generated, corresponding to the new subset, and a transition is created from D to F on the symbol X. This new DFA state F is considered for transitions on each possible input symbol. When this process has been competed for every existing DFA state D and every symbol X, the DFA is complete.

For example, DFA state D1 may represent a subset of NFA states containing N1 and N2. Symbolically, this may be represented as D1={N1,N2}. N1 may transition to N3 on a particular symbol, such as 'a', and to N4 on a different symbol, such as 'b'. N2, however, may transition to both N1 and N4 on the symbol 'a'. On the symbol 'a', since N1 transitions to N3, and N2 transitions to N1 and N4, a destination DFA state D2 will be equivalent to N1, N3 and N4; D2={N1,N3, N4}. D2 is constructed, along with a transition from D1 to D2 on 'a'. On the symbol, since N1 transitions to N4, a destination DFA state D3 (D3={N4}) is constructed, along with a transition from D1 to D3 on 'b'.

After subset construction is complete, information about the NFA state subsets corresponding to each DFA state may be discarded. In the example above, after discarding the NFA subset information, D1, D2 and D3 are considered as atomic DFA states without substructure, which happen to carry transitions from D1 to D2 on 'a', and from D1 to D3 on 'b'. Construction of a DFA in this manner allows the DFA to be able to be executed on its own given stimulus of a stream of input symbols without any reference to the original NFA states or subsets. When a DFA is constructed from NFAs for multiple rules, each DFA state is involved in matching one or more rules. Each DFA state does not need to carry any explicit indication of which rule(s) it is involved with, except that an 'accepting' DFA state, which will complete a match for one or more rules and must normally indicate which rules it accepts for—such as by carrying a list of rule or token IDs to be issued upon a match.

FIG. 1 shows a subset construction of a DFA for a Rule1. Rule1 110 in this example is [ab][cd]*[cde]. An NFA1 120 from this rule is shown. A subset construction 130 of the NFA1 120 will start with a state representing an NFA start state. This NFA start state is N1.0. As is understood, since there is a single rule in this example, there is but a single start state. In constructing the DFA by subset construction 130, the start state is the subset of all NFA1 120 start states (here N1.0). D1.0 is the resultant DFA1 140 state and transitions to D1.1 on [ab]. As shown in the table 150, the DFA1 140 states each represent a subset of NFA1 states. The DFA1 Subset Table 150, or subset list, indicates that D1.0={N1.0}, D1.1={N1.1}, D1.2={N1.2} and D1.3={N1.1, N1.2}. DFA1 140 state D1.3 represents a subset of multiple NFA1 120 states, {N1.1, N1.2}. This arises in subset construction 130 because in NFA1 120, state N1.1 transitions both to itself N1.1 and to next state N1.2 on symbols 'c' and 'd'; thus in subset construction 130 the subset {N1.1} (becoming D1.1 in DFA1 140) transitions on symbol class [cd] to the larger subset {N1.1,N1.2} (becoming D1.3 in DFA1 140).

Figure 2:
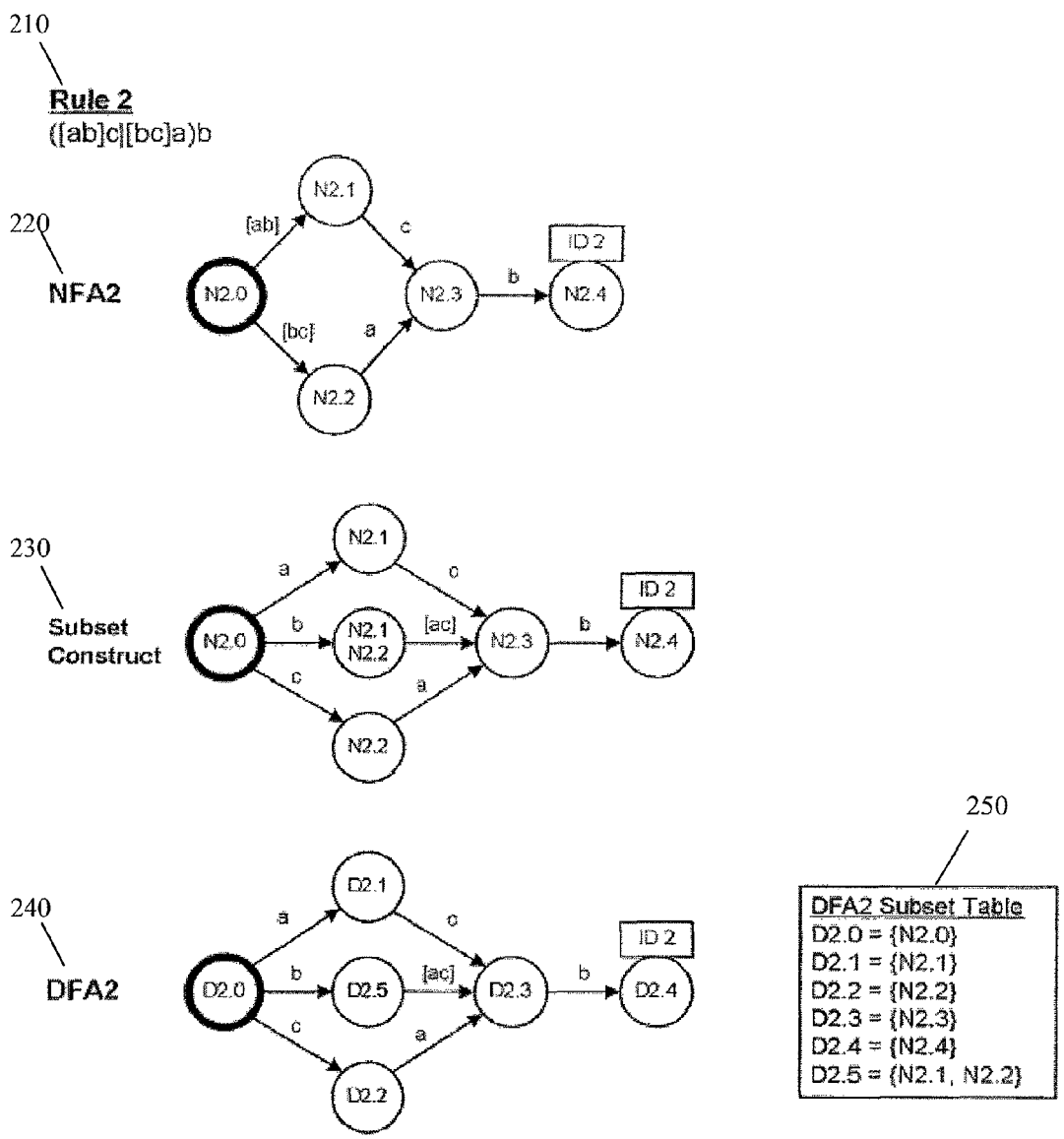
FIG. 2 shows a subset construction of a DFA for a Rule2.

FIG. 2 shows a subset construction of a DFA for a Rule2. Rule2 210 in this example is ([ab]c|[bc]a)b. An NFA2 220 from this rule is shown. A subset construction 230 of the NFA2 220 will start with a state representing an NFA start state. This NFA start state is N2.0. As is understood, since there is a single rule in this example, there is but a single start state. In constructing the DFA by subset construction 230, all of the next states on a transition from a state (here N2.0) will be collected by referencing NFA2 220. D2.0 is the resultant DFA2 240 state and transitions to D2.1, D2.5 or D2.2 on a, b or c respectively. This is because in NFA2 220, state N2.0 transitions only to N2.1 on 'a' ({N2.1} becoming D2.11, to both N2.1 and N2.2 on 'b' ({N2.1,N2.2} becoming D2.5), and only to N2.2 on 'c' ({N2.2} becoming D2.2). As shown in the table 250, or subset list, indicates that D2.0={N2.0}, D2.1={N2.1}, D2.2={N2.2}, D2.3={N2.3}, D2.4={N2.4}, and D2.5={N2.1, N2.2}.

Figure 3:
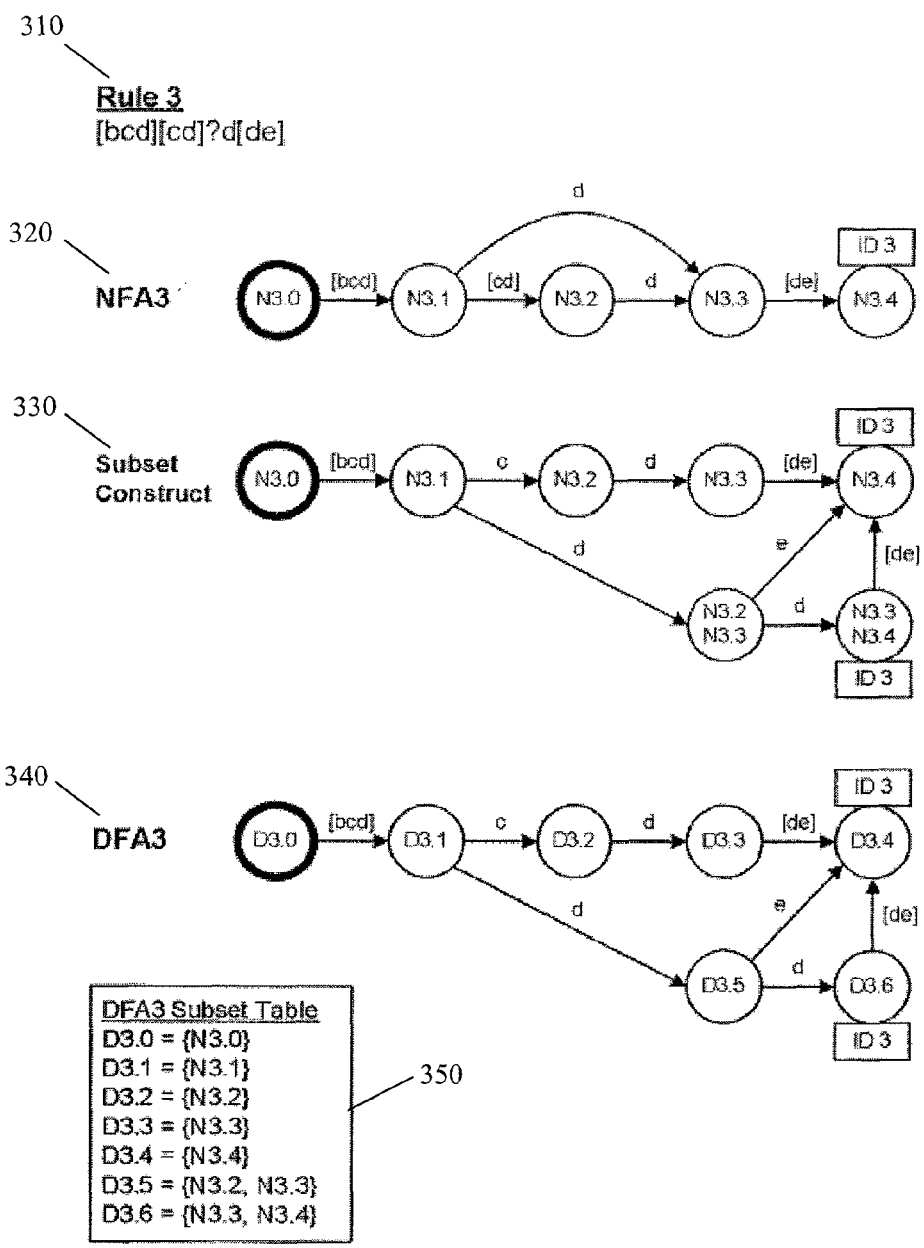
FIG. 3 shows a subset construction of a DFA for a Rule3.

FIG. 3 shows a subset construction of a DFA for a Rule3. Rule3 310 in this example is [bcd][cd]?d[de]. An NFA3 320 from this rule is shown. A subset construction 330 of the NFA3 320 will start with a state representing an NFA start stare. This NFA start state is N3.0. As is understood, since there is a single rule in this example, there is but a single start state. In constructing the DFA by subset construction 330, all of the next states on a transition from a state (here N3.0) will be collected by referencing NFA3 320. D3.0 is the resultant DFA3 340 state and transitions to D3.1. Later in the DFA3 340, state D3.5 transitions to states D3.4 and D3.6 as examples of transitions on different symbols. As shown in the table 350, or subset list, indicates that D3.0={N3.0}, D3.1={N3.1}, D3.2={N3.2}, D3.3={N3.3}, D3.4={N3.4}, D3.5={N3.2, N3.3}, and D3.6={N3.3,N3.4}.

In an embodiment of the invention, a method for constructing a DFA for multiple rules is disclosed. Each rule is compiled into separate NFAs. Rather than directly transforming these multiple NFAs into a single DFA, each rule's single NFA is transformed into a separate DFA, by traditional subset construction. Information about NFA states and subsets may then be discarded. As is understood by those skilled in the art, at this stage in the method, one traditional abstract DFA has been constructed for each rule.

Each single-rule DFA may be considered as an NFA, and all of the single-rule DFAs may be transformed into a one multi-rule "composite" DFA by subset construction. However, subset information is retained. Each composite DFA state thus will correspond to a subset of the entire collection of single-rule DFA states. These subsets are unique in that the subset construction was performed on a collection of DFAs instead of general NFAs. The root composite DFA state corresponds to a subset containing exactly one state from each single-rule DFA, namely all the root states. Each subset will contain at most one state from each single-rule DFA, since by the definition of DFAs, each single-rule DFA state can only transition to at most one destination state on each symbol which will be within the same single-rule DFA. Subset construction will not produce a composite DFA state corresponding to a subset containing more than one state from any single-rule DFA.

The composite DFA's subset information, comprising a list of at most one DFA state from each single-rule DFA for each composite DFA state, is retained, as noted above. The subset information is represented in such a manner that which rule each single-rule DFA state corresponds to is efficiently determined. For example, each listed DFA state may be represented using a rule number and a state number within that rule, or a lookup table from state IDs to rule IDs may be maintained. A range of consecutive state IDs corresponding to each rule may be stored as well. The subset information allows for efficient and optimized deletion of selected rules from the composite DFA. However, the DFA may be encoded into compact representations omitting subset information for purposes of DFA execution to scan streams of input symbols. The subset information is not required for DFA execution, as is understood, but rather for DFA modification by incremental compilation.

DFA modification involving adding a rule to the composite DFA using incremental compilation may comprise the following: The new rule is compiled alone into a single-rule DFA as noted, with subset information discarded. Subset construction is performed to generate a new composite DFA, using the old composite DFA as one NFA input and the new single-rule DFA as a second NFA input. Subset information is retained, but may be adjusted. States in the new composite DFA may each have one or two members in their respective subsets, one state from the new single-rule DFA and one state from the old composite DFA. If a state from the old composite DFA is present, it in turn has subset information listing various states from the other single-rule DFAs. This subset list may be combined into the new composite DFA state's subset list. The combining of the lists information may be done in a fashion so that the new composite DFA is not hierarchical, but formed into lists of states from old and new single-rule DFAs. A batch of multiple rules may be added to the composite DFA similarly, by generating multiple new single-rule DFAs, and subset-constructing the new composite DFA from NFA inputs of the old composite DFA and all new single-rule DFAs. Alternatively, single-rule additions may be performed multiple times.

Figure 4:
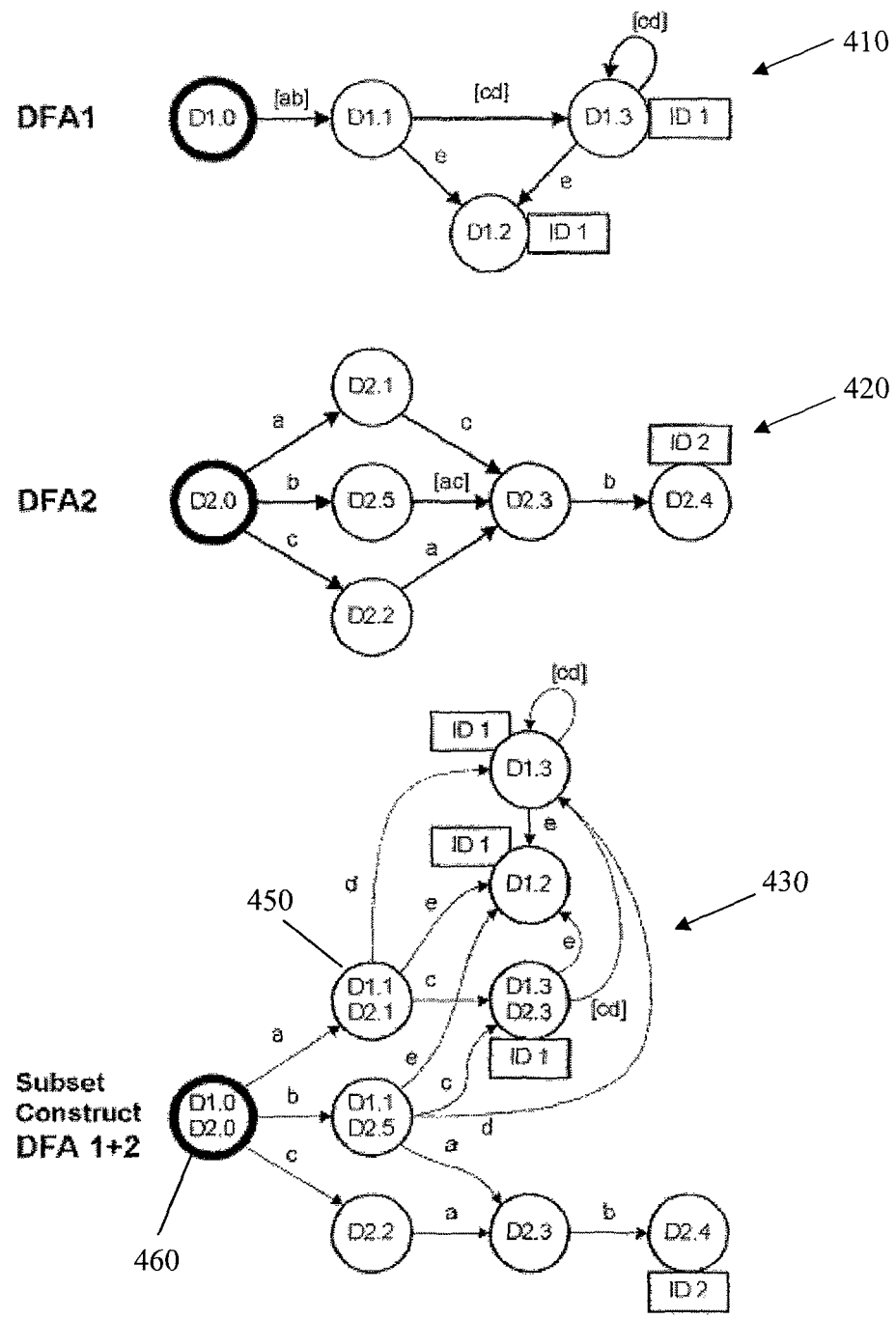
FIG. 4 shows a subset construction of DFA1 and DFA2.

FIG. 4 shows a subset construction of DFA1 and DFA2. DFA1 410 is shown in the same form as FIG. 1. DFA2 420 is shown in the same form as FIG. 2. The subset construction of the combined DFAs is shown in composite DFA1+2 430. Each state of the DFA1+2 430 indicates the DFA1 410 and DFA2 420 states which combine to form that particular state. For instance, the root state 440 of DFA1+2 430 is a combination of D1.0 and D2.0 of DFA1 410 and DFA2 420 respectively. Also, for example, the root state transitions on 'a' to a state 450 which is a combination of D1.1 and D2.1.

Figure 5:
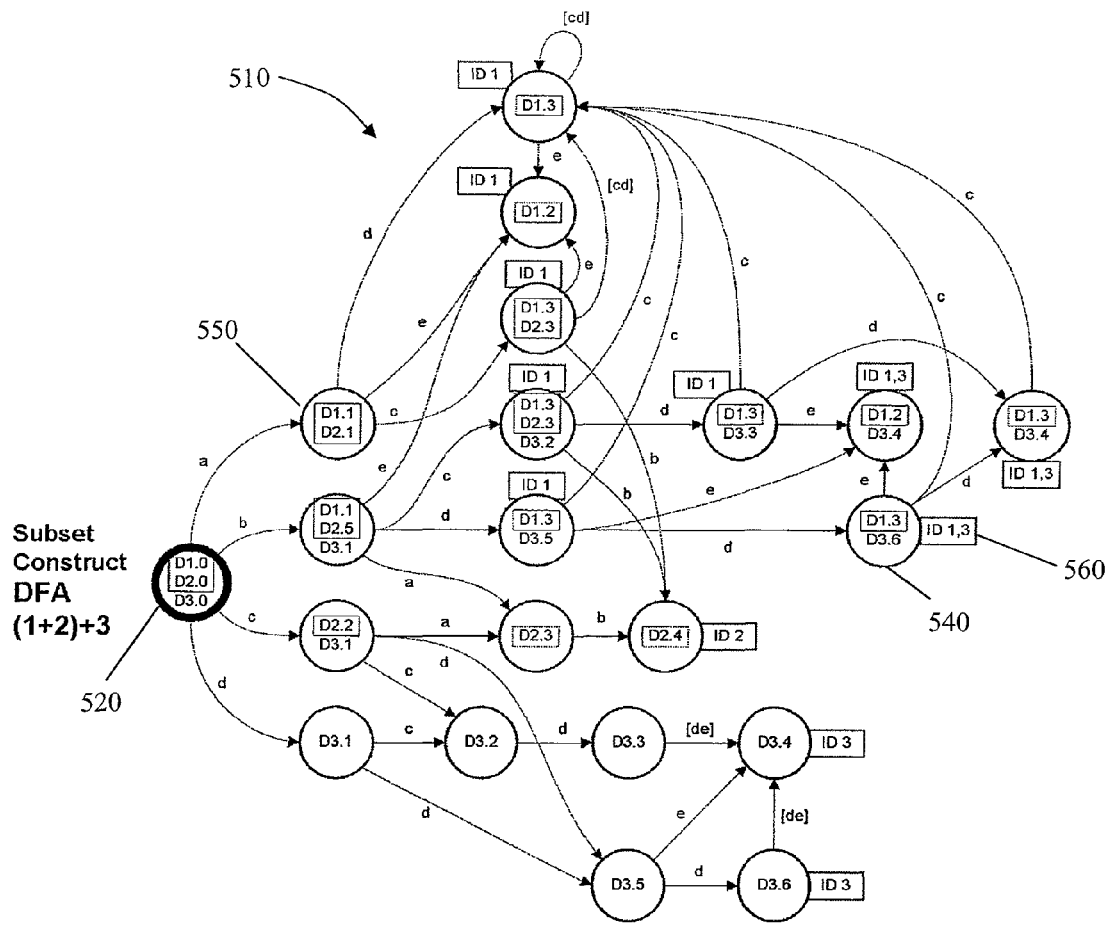
FIG. 5 shows a subset construction of DFA1+2 and DFA3.

FIG. 5 shows a subset construction of DFA1+2 and DFA3. The DFA(1+2)+3 510 shows the subset construction results of the combination of DFA3 with the previous composite of DFA1 and DFA2. The intermediate step of combining DFA1 and DFA2 was shown in FIG. 4. It is understood that different series of combinations are possible, such as combining DFA2 and DFA3 initially and then combining DFA1. DFA1, DFA2 and DFA3 could also be combined in a single subset construction step. Each state in the DFA(1+2)+3 510 indicates the states of the previous DFAs which combine to form the new combination states. For instance, the root state 520 contains two states in its subset, one of which is the set {D1.0, D2.0} corresponding to the root state 460 of DFA1+2 of FIG. 4, and the second of which is D3.0 corresponding to the root state of DFA3 340 of FIG. 3. The root state 520 transitions on 'a' to a state 550 which has a single element {D1.1,D2.1} in its subset, which is a combination of D1.1 and D2.1 corresponding to single state 450 in FIG. 4. No new state subset information has been added to this state from that of the transition shown in FIG. 4. However, a later state 540 shows a combination of D1.3 and D3.6. This is a new subset combination for the DFA(1+2)+3 510. Also, a combination of ID tokens is shown. An ID 560 shows a combination of ID1 and ID3 from DFA1 and DFA3 respectively.

Figure 6:
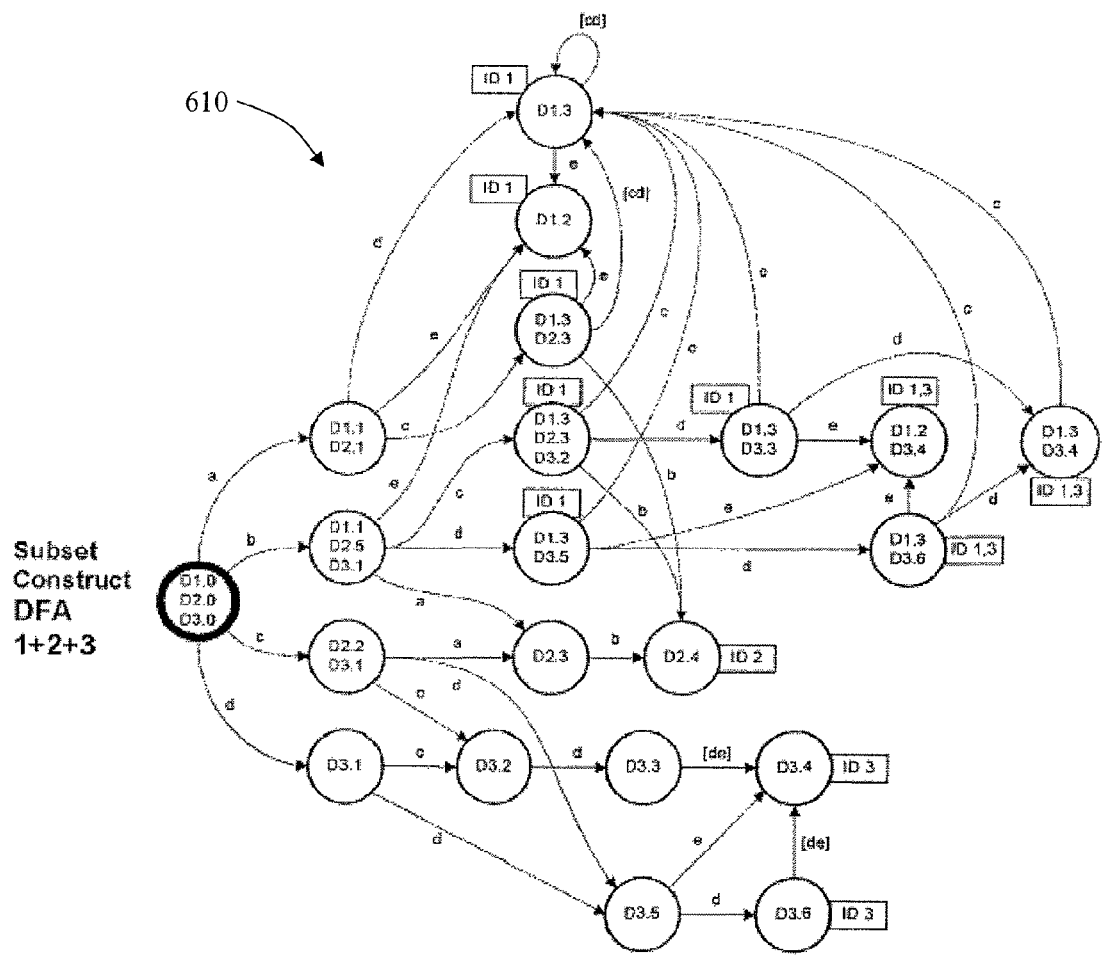
FIG. 6 shows a subset construction of DFA1, DFA2 and DFA3.

FIG. 6 shows a subset construction of DFA1, DFA2 and DFA3. This DFA1+2+3 610 is identical to the DFA of FIG. 5. The only difference is that the intermediate subset construction combination indicators have been removed. Whereas the subset information in DFA(1+2)+3 510 in FIG. 5 was hierarchical, the subset information DFA1+2+3 610 is flattened. For example, whereas the root state 520 of DFA(1+2)+3 in FIG. 5 has the hierarchical (nested) subset {{D1.0,D2.0}, D3.0}, the root state of DFA1+2+3 610 has the flattened subset {D1.0,D2.0,D3.0}. This DFA1+2+3 shows that the same DFA results regardless of the sequence of combining the subset constructed DFAs.

A rule may be efficiently deleted from the composite DFA in accordance with the following method: The subset information is searched for subsets containing single-rule DFA states corresponding to the rule being deleted and all such single-rule DFA state references are deleted from the subset lists. Because only one state from the deleted rule's DFA can exist in each subset, searching a subset list can terminate after deleting one state reference. Any composite DFA state whose subset becomes empty after this deletion will itself be deleted, along with all composite DFA transitions into or out of that state. A composite DFA state with multiple members in its subset will retain a non-empty subset after a deletion from its subset, and such a state will not be deleted. All rule or token IDs within the composite DFA will be deleted which indicate matches of the rule being deleted.

Figure 7:
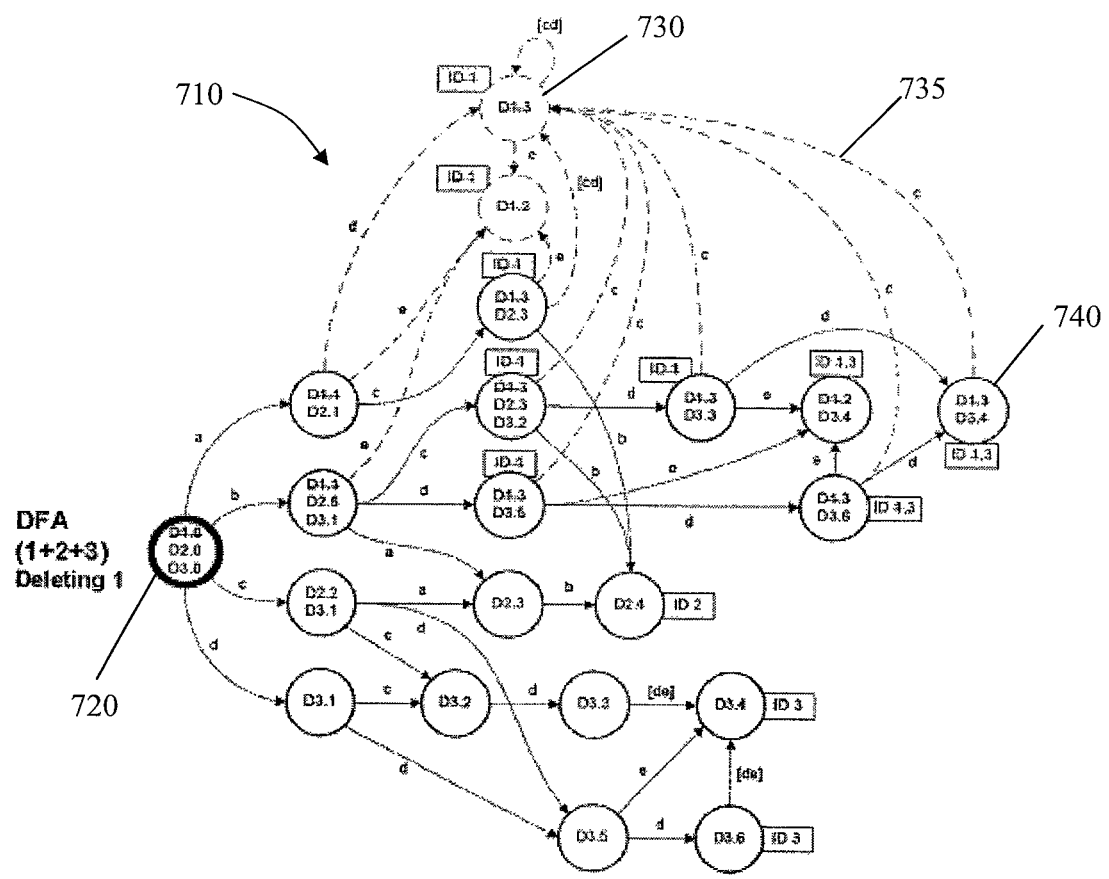
FIG. 7 shows subset construction of DFA1+2+3 with DFA1 deleted.

FIG. 7 shows subset construction of DFA1+2+3 with DFA1 deleted. The search is performed to identify single-rule DFA states which correspond to DFA1. This is indicated in the DFA 710 by crossing out the D1.X information. For instance, in the root state, the search found and identified D1.0 as belonging to the DFA1 to be deleted. A state 730 which had subset information belonging only to DFA1 will result in an empty state, which will therefore be deleted. All transitions 735 to and from the resulting empty state are deleted. These are shown in the FIG. 7 with dotted transitions. All IDs 740 belonging to DFA1 can likewise be deleted.

At this point in adding and deleting DFA states from a composite, the composite DFA is a valid DFA matching the reduced rule set omitting the deleted rule, but it may be further assessed. When multiple rules are compiled into a single DFA, one state generated for one rule is split into multiple variants to accommodate a second rule. If the second rule is deleted, multiple copies of the state may unnecessarily remain and are merged back into a single state. Using the composite DFA's subset information (which now omits the deleted rule), such optimizing merges can be efficiently performed. Any two composite DFA states which, after deletion, have identical subset information are merged into a single composite DFA state. The two subsets may have come to be identical because each previously contained different single-rule DFA states from the deleted rule, but matched in membership from all other single-rule DFAs, or because one state previously contained a single-rule DFA state from the deleted rule, while the other did not.

When two identical DFA states are merged, it is necessary to retain all transitions into each of them which will not be the same, as a transition into the merged state. If each of the two identical states had a transition from the same source state, which would necessarily be on different symbols or disjoint symbol classes, these transitions may be merged into a single transition into the merged DFA state, on the union of the symbol classes, if the DFA representation in use labels transitions with multi-symbol classes. Concerning output transitions from the merged composite NFA state, the transitions from either one of the original states may simply be retained, as the other original state necessarily has identical out-transitions, or in some cases out-transitions into two destination states that themselves will get merged together. Likewise, rule or token IDs labeling accepting DFAA states may be taken from either of the tow original states merged together, because they are necessarily identical on both original states.

After performing such state merging in the composite DFA, it again achieves the property that each composite DFA state has unique subset information. The composite DFA may be optimized post deletion, and is isomorphic to the DFA that would be subset-constructed from only the remaining rules.

Figure 8:
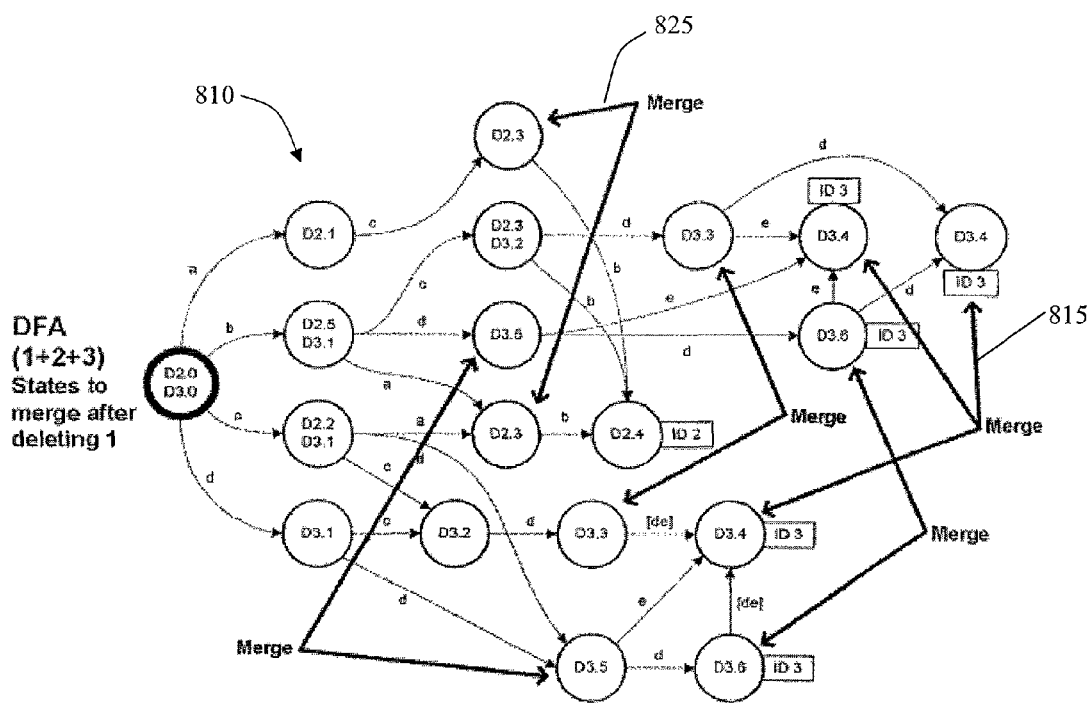
FIG. 8 shows merging states after a deletion of DFA1.

FIG. 8 shows merging states after a deletion of DFA1. Several of the remaining states in the DFA2+3 810 will be identical states. These are states that previously had differing subset information in DFA1+2+3 (FIG. 6), but after deletion of DFA1 subset information (FIG. 7), now have identical remaining subset information. For instance, several states relate solely to state D3.4 815. Also, several states relate solely to state D2.3. These states are identified by their subset construction information to be merged.

Figure 9:
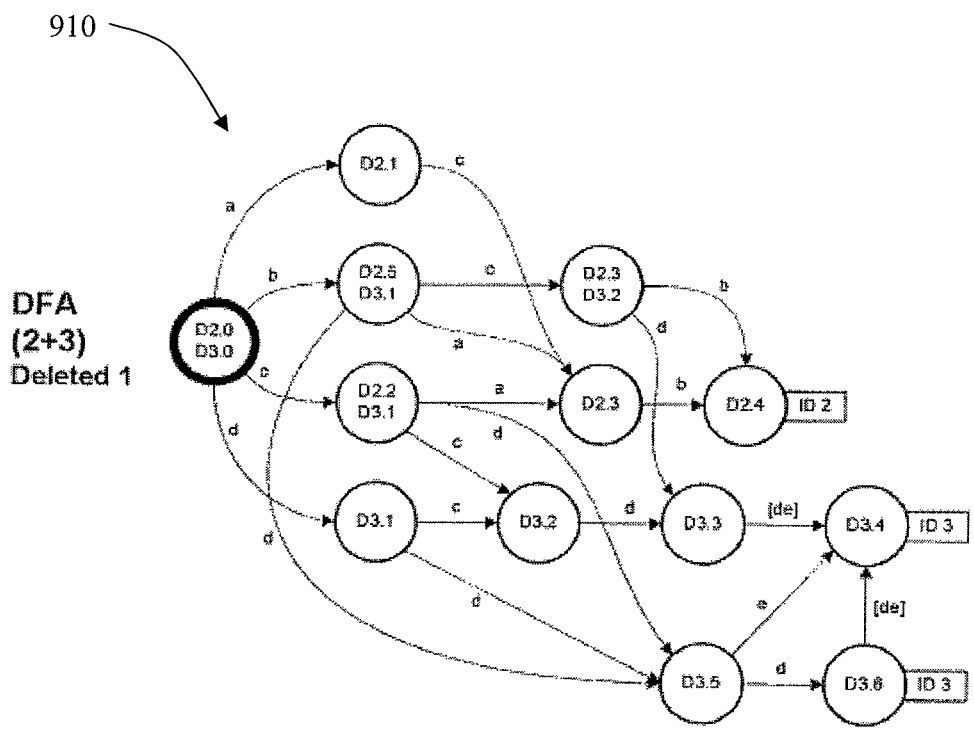
FIG. 9 shows the merging of redundant states after deleting DFA1.

FIG. 9 shows the merging of redundant states after deleting DFA1. The DFA2+3 910 shows the DFA after the states identified to be merged are combined. It is understood, that this DFA2+3 is identical to a DFA that would be constructed according to the method of this invention if Rule2 of FIG. 2 and Rule3 of FIG. 3 were combined.

Figure 10:
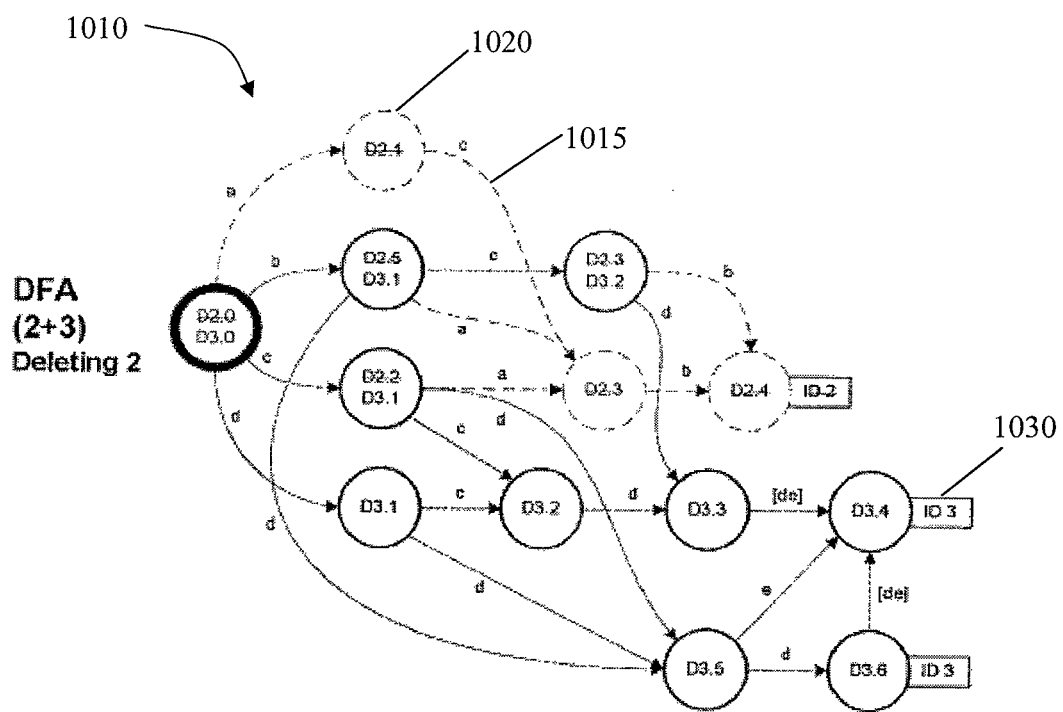
FIG. 10 shows subset construction of DFA2+3 with DFA2 deleted.

FIG. 10 shows subset construction of DFA2+3 with DFA2 deleted. The search is performed to identify single-rule DFA states which correspond to DFA2. This is indicated in the DFA 1010 by crossing out the D2.X information. For instance, in the root state, the search found and identified D2.0 as belonging to the DFA2 to be deleted. A state 1020 which had subset information belonging only to DFA2 will result in an empty state. All transitions 1015 to and from the resulting empty state are deleted. These are shown in the FIG. 10 with dotted transitions. All IDs 1030 belonging to DFA2 can likewise be deleted.

Figure 11:
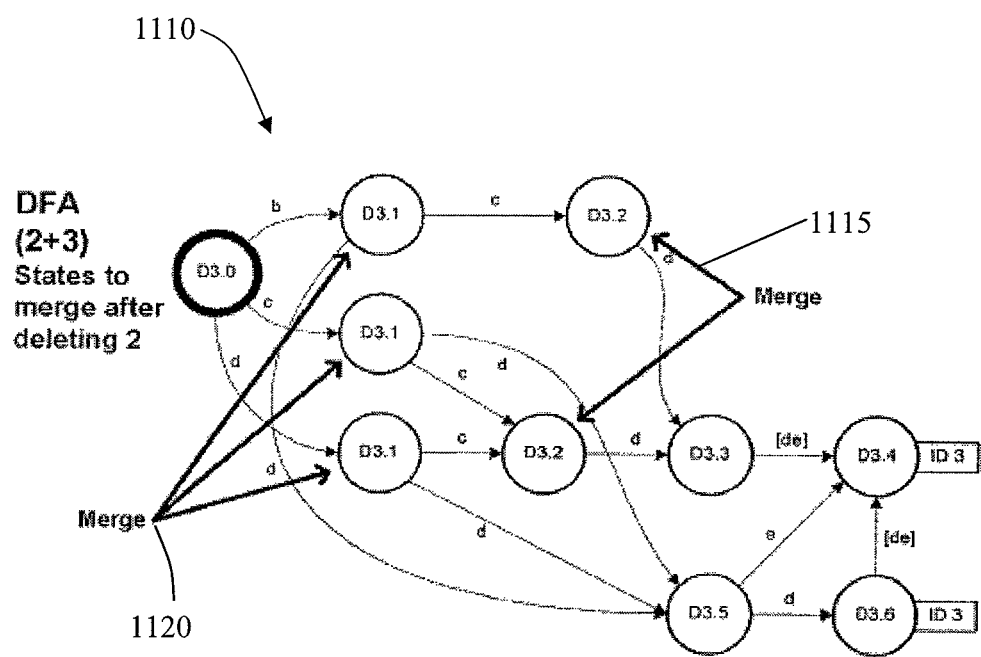
FIG. 11 shows merging states after a deletion of DFA2.

FIG. 11 shows merging states after a deletion of DFA2. Several of the remaining states in the DFA3 1110 will be identical states. These are states that previously had differing subset information in DFA2+3 (FIG. 9), but after deletion of DFA2 subset information (FIG. 10), now have identical remaining subset information from just the original DFA3. The merger 1115 shows identification of two D3.2 states. The merger 1120 shows identification of three D3.1 states.

Figure 12:
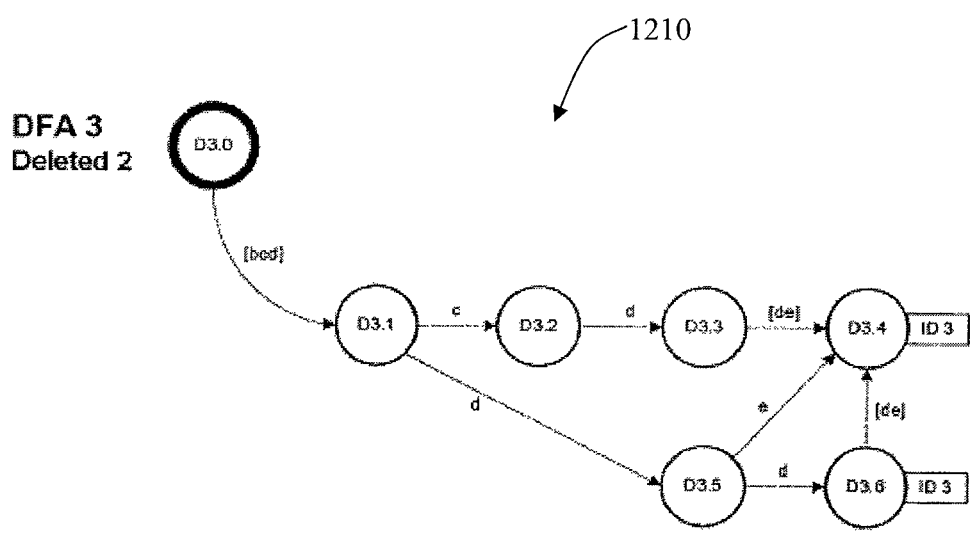
FIG. 12 shows the merging of redundant states after deleting DFA2.

FIG. 12 shows the merging of redundant states after deleting DFA2. The DFA3 1210 shows the DFA after the states identified to be merged are combined. It is understood, that this DFA3 1210 is identical to the DFA3 of FIG. 3 that would be constructed according to subset construction.

A batch of multiple rules may be deleted from the composite DFA similarly, by deleting from subset lists every reference to a single-rule DFA state for any deleted rule, and every rule or token ID indicating a match of any deleted rule. Deleting any composite DFA state whose subsets become empty, or merging any composite DFA states whose subsets become identical. Single-rule deletions may be performed multiple times.

A rule may be "changed" in the composite DFA by deleting its old version, and adding its new version. A batch of changes may be made by multiple single deletions and additions, or by deleting the batch of old versions and adding the batch of new versions.

In an embodiment of the invention, the composite DFA's subset information may comprise lists of single-rule NFA states, rather than single-rule DFA states. The system will work in like manner with recognition that one composite DFA state's subset may contain multiple NFA states from the same single-rule NFA, in place of a single single-rule DFA state. There may be more subset information to store, and also more to compare when determining which composite DFA states to merge after a deletion. Accordingly, retained subset information may comprise references to single-rule DFA states rather than NFA states. Further, single-rule NFA states corresponding to each composite DFA state may be retrievable and then a table mapping each single-rule DFA state to its component single-rule NFA states may be stored during single-rule DFA construction.

In an embodiment of the invention, the composite DFA's subset information may comprise references to involved rules, rather than single-rule DFA states. This may result in slightly less information than storing for each composite DFA state a list of comprised single-rule DFA state references and less resource utilization. More complex algorithms may be required to optimize the composite DFA after deletions without full subset information.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of constructing a composite DFA (deterministic finite automaton) using subset construction, said method comprising:
   compiling at least one single-rule DFA;
   performing a first subset construction on said at least one single-rule DFA to generate a first composite DFA, retaining subset information for said first composite DFA;
   compiling at least one new rule into at least one corresponding additional single-rule DFA;
   performing a second subset construction to generate a second composite DFA, wherein said first composite DFA acts as a first NFA (non-deterministic finite automaton) input for said second subset construction and said at least one corresponding additional single-rule DFA acts as at least one additional NFA input for said second subset construction, retaining subset information for said second composite DFA;
   searching said subset information for subsets containing single-rule DFA states corresponding to a rule to be deleted;
   deleting all single-rule DFA state references found during the search from said subset information; and
   deleting any composite DFA state whose subset becomes empty after said step of deleting all single-rule DFA state references.

2. The method of claim 1, wherein said at least one new rule comprises a plurality of new rules, and said at least one corresponding additional single-rule DFA comprises a plurality of corresponding single-rule DFAs.

3. The method of claim 1, said method further comprising merging said composite DFA states whose subsets become identical after the step of deleting all single-rule DFA state references.

4. The method of claim 1, further comprising deleting all token IDs within said composite DFA which indicate matches to said deleted rule.

5. A method of constructing a composite DFA (deterministic finite automaton) using subset construction, said method comprising:
   compiling a plurality single-rule DFAs;
   performing a first subset construction on said plurality single-rule DFAs to generate a first composite DFA, retaining subset for said first composite DFA;
   searching said subset information for subsets containing single-rule DFA states corresponding to a rule to be deleted;
   deleting all single-rule DFA state references found during said search from said subset information; and
   deleting any composite DFA state whose subset becomes empty after said step of deleting all single-rule DFA state references.

6. The method of claim 5, further comprising deleting all token IDs within said composite DFA which indicate matches to said deleted rule.

7. The method of claim 5, further comprising merging the composite DFA states whose subsets become identical after the step of deleting all single-rule DFA state references.

8. A computer system comprising a non-transitory computer readable medium including programmed instructions, a compiler and a first set of rules for constructing a composite DFA (deterministic finite automaton) using subset construction, wherein the instructions, when executed by a computer, cause the computer system to:
   compile a first set of single-rule DFAs from said first set of rules;
   subset construct said single-rule DFAs into a first composite DFA, retaining subset information for said first composite DFA;
   compile at least one new rule into at least one corresponding additional single-rule DFA;
   subset construct a second composite DFA using said first composite DFA as a first NFA (non-deterministic finite automaton) input for subset construction and said at least one corresponding additional single-rule DFA as at least one additional NFA input for subset construction, retaining subset information;

delete at least one rule from said set of rules by use of a search of said subset information for subsets containing single-rule DFA states corresponding to a rule to be deleted;

delete all single rule DFA state references found during said search from said subset information; and delete any composite DFA state whose subset becomes empty.

9. The system of claim 8, wherein said computer system is further caused to delete all token IDs within said composite DFA which indicate matches to the deleted at least one rule.

10. The system of claim 8, wherein the computer system is further caused to merge said composite DFA states whose subsets become identical.

* * * * *